(12) United States Patent
Schwab (10) Patent No.: US 8,047,692 B2
(45) Date of Patent: Nov. 1, 2011

(54) VEHICLE HEADLAMP ASSEMBLY

(75) Inventor: Leo F. Schwab, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 12/211,367

(22) Filed: Sep. 16, 2008

(65) Prior Publication Data

US 2010/0067252 A1  Mar. 18, 2010

(51) Int. Cl.
*F21V 33/00* (2006.01)
*F21V 15/04* (2006.01)

(52) U.S. Cl. .................... 362/506; 362/369; 362/507

(58) Field of Classification Search ............... 362/277, 362/285, 319, 506, 507, 512, 523, 549
See application file for complete search history.

(56) References Cited

U.S. PATENT DOCUMENTS

| 4,475,148 A * | 10/1984 | Tomforde ............... 362/549 |
| 5,268,825 A | 12/1993 | Blancheton |
| 6,331,068 B1 * | 12/2001 | Chase .................. 362/549 |
| 2006/0227565 A1 * | 10/2006 | Nantais et al. .......... 362/507 |
| 2008/0315625 A1 * | 12/2008 | Suzuki et al. ........... 362/549 |

FOREIGN PATENT DOCUMENTS

KR  2003-0031679 A  4/2003

* cited by examiner

*Primary Examiner* — Y My Quach Lee
(74) *Attorney, Agent, or Firm* — Quinn Law Group, PLLC (57) ABSTRACT

A vehicle body includes a fender and a headlamp assembly. The headlamp assembly defines an upwardly exposed and unobstructed surface, and is movably mounted with the fender such that the headlamp assembly moves from a first position to a second position in response to a load having a vertical component acting on the surface.

13 Claims, 6 Drawing Sheets

VEHICLE HEADLAMP ASSEMBLY

TECHNICAL FIELD

This invention relates to vehicle headlamp assemblies.

BACKGROUND OF THE INVENTION

The front end of a vehicle body typically includes fenders and a hood, which define part of the upper surface of the vehicle body. In certain vehicle impact situations, an object may exert a downward force on the upper surface of the front of the vehicle body, on or near the hood or fenders. Deformation of the body absorbs energy from the force; however, deformation may be limited due to the presence of structural members of the vehicle body.

SUMMARY OF THE INVENTION

A vehicle body includes a fender and a headlamp assembly. The headlamp assembly defines an upwardly exposed and unobstructed surface, and is movably mounted with respect to the fender such that the headlamp assembly moves from a first position to a second position in response to a load having a vertical component acting on the surface. Accordingly, the movement of the headlamp assembly may absorb energy from an object exerting a downward force on the upwardly exposed surface.

The vehicle body may include a gap between the headlamp assembly and the fender to accommodate movement of the headlamp assembly with respect to the fender. In an exemplary embodiment, a member is mounted with respect to the headlamp assembly to at least partially conceal the gap. The member is sufficiently positioned to receive a reaction force from the fender when the headlamp assembly moves in response to the load, and is characterized by a strength discontinuity that deforms when the headlamp assembly moves from its first position to its second position.

A corresponding headlamp assembly is provided. The headlamp assembly includes a lens defining a surface. The headlamp assembly is mountable to the body such that the surface is upwardly exposed and unobstructed and such that the lens moves with respect to the fender in response to a load having a vertical component being applied to the surface. A member is mounted to the lens such that the member receives a reaction force from the fender when the lens moves in response to the load.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
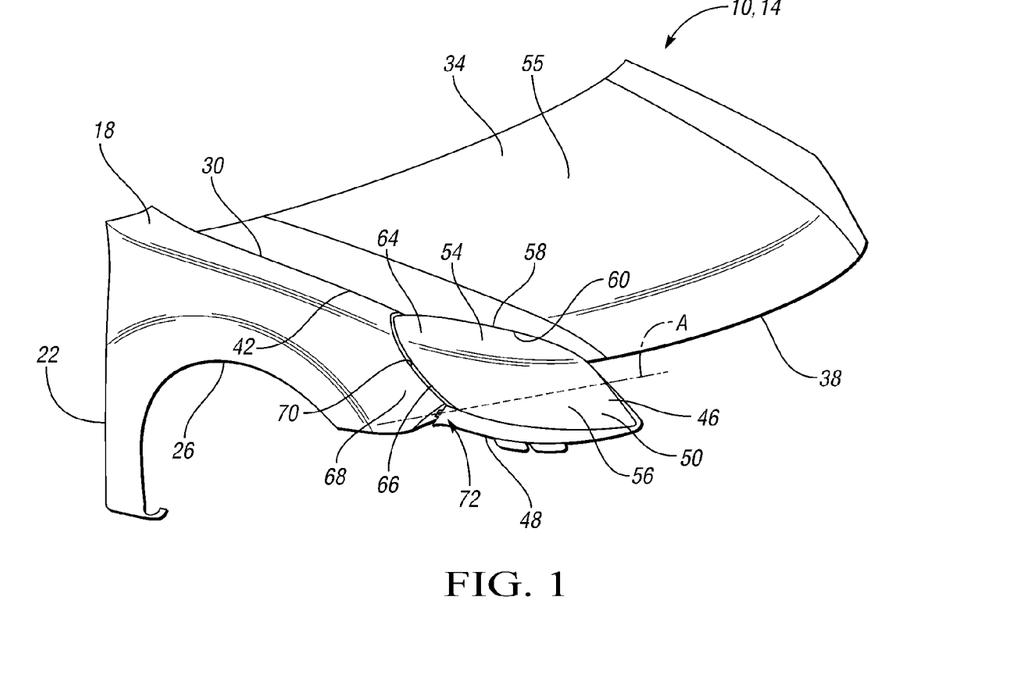
FIG. 1 is a schematic, perspective view of a portion of a vehicle body including a fender and a headlamp assembly.
Figure 2:
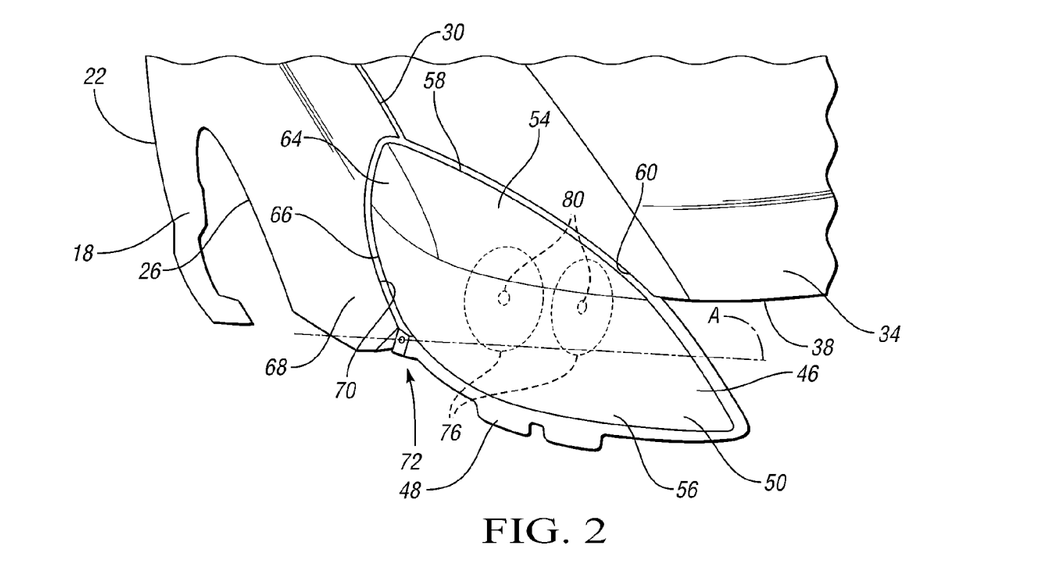
FIG. 2 is another schematic, perspective view of the vehicle body of FIG. 1.

Referring to FIGS. 1 and 2, a vehicle 10 includes a vehicle body 14. The vehicle body 14 includes two fenders 18, only one of which is shown in FIG. 1. Fender 18 includes a rearward portion 22 that defines a hinge pillar for rotatable supporting a door (not shown) as understood by those skilled in the art. Fender 18 also defines a wheel well opening 26. An edge 30 of the fender 18 abuts a hood 34.

The hood 34 is mounted to a cowl member (not shown) via hinges (not shown), as understood by those skilled in the art, such that the hood 34 is rotatable between an open position and a closed position. In the closed position, as shown in FIG. 1, the hood 34 covers an engine compartment. The hood 34 includes a forward edge 38 and a lateral edge 42. The lateral edge 42 of the hood 34 abuts the edge 30 of the fender 18.

The body 14 also includes a headlamp assembly 46. The headlamp assembly 46 includes a housing 48 and a transparent or translucent lens 50 mounted to the housing 48. A surface 54 of the lens 50 is generally horizontal, i.e., more horizontal than vertical. The surface 54 of the lens 50 is upwardly exposed and uncovered by any other part of the vehicle body 14, and thus defines a portion of the upper surface 55 of the vehicle body 14. A surface 56 of the lens 50 is generally vertically oriented and generally faces forward with respect to the vehicle body 14. The generally horizontal surface 54 of the lens 50 terminates at an edge 58. An edge 60 of the hood 34 is adjacent to, and follows the contour of, the edge 58.

A lateral portion 64 of the lens 50 terminates at edge 66. The fender 18 includes portion 68, which terminates at edge 70. The lateral portion 64 of the lens 50 extends above and over portion 68 of the fender 18, and edge 66 is adjacent to, and follows the contour of, edge 70. The housing 48 includes a plurality of attachments at which the headlamp assembly 46 is mounted to the rest of the body 14, such as at the fender 18 or other structural body components (not shown). In the embodiment depicted, the attachments are tabs 72 (only one of which is shown in the figures) through which a threaded fastener is extendable, as understood by those skilled in the art.

The headlamp assembly 46 further includes a bezel 76 and light sources 80. The bezel 76 and the light sources 80 are mounted to the housing 48 and positioned such that light from the light sources 80 is transmitted through the lens 50, as understood by those skilled in the art. Exemplary light sources include incandescent bulbs.

Figure 3:
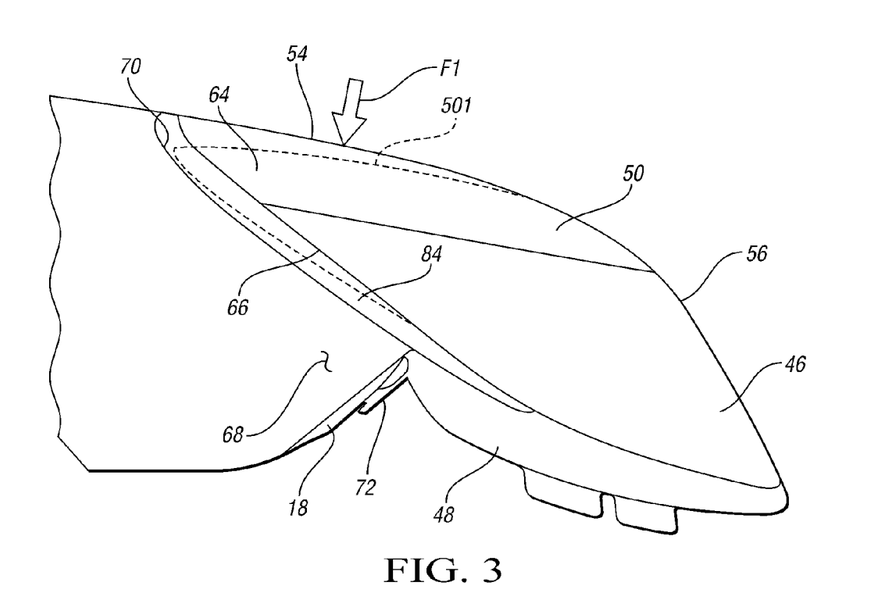
FIG. 3 is a schematic, side view of the headlamp assembly and the fender of FIG. 1.

Referring to FIG. 3, the headlamp assembly 46 is configured such that a load F1 having a vertical component applied to the generally horizontal surface 54 causes the lens 50 to move with respect to the fender 18. In the embodiment depicted, the movement includes rotation of the lens 50 about an axis (shown at A in FIGS. 1 and 2) from a first position shown at 50 to a second position shown in phantom at 501. Movement of the headlamp with respect to the fender 18 may include rotation and/or translation within the scope of the claimed invention.

In the embodiment depicted, the headlamp assembly 46 includes upper attachments and lower attachments at which the headlamp assembly 46 is connectable to the rest of the vehicle body 14, and the upper attachments are configured to deform or break in response to the load F1 so that the headlamp assembly 46 rotates about the lower attachments. Other means of mounting the headlamp assembly 46 with respect to the fender 18 such that the headlamp assembly 46 is selectively movable with respect to the fender 18 may be employed within the scope of the claimed invention. The deformation of the attachments absorbs energy from the load F1.

Figure 4A:
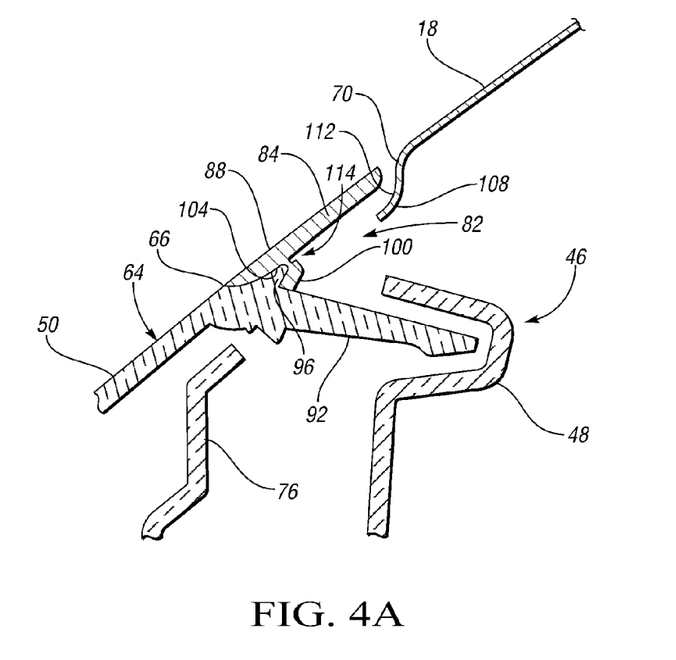
FIG. 4A is a schematic, cross-sectional view of portions of the headlamp assembly and the fender of FIGS. 1-3 with the lens of the headlamp assembly in a first position.

Referring to FIG. 4A, the headlamp assembly 46 and the fender 18 are sufficiently spaced to accommodate the rotation of the lens 50 from its first position to its second position. More specifically, the lens 50 in its first position and the fender 18 define a gap 82 therebetween. The gap 82 is large enough so that the fender 18 is not in the path of the lens 50 as it travels from its first position, as shown in FIG. 4A, to its second position, as shown in FIG. 4C. The gap 82 is characterized by an opening in the exterior surface of the body 14 between the edge 66 of the lens 50 and the fender 18.

A member 84 is mounted to the lens 50 to form an outer frame thereof. The member 84 is mounted to the lens 50 such that the member 84 extends across at least part the opening of the gap 82. The member 84 defines a surface 88 that forms a portion of the exterior surface of the vehicle body 14. Accordingly, the member 84 obstructs and conceals the gap 82, or at least a portion thereof, from an observer outside the vehicle body 14.

The lens 50 defines an arm 92 that extends inboard from the opening of the gap 82 and that operatively connects the lens 50 to the housing 48. The lens 50 also defines a protrusion 96 that extends from the arm 92 into the gap 82. The member 84 defines an integral clip 100 that defines a cavity 104. The clip 100 and the protrusion 96 are fastening elements that cooperate to operatively connect the member 84 to the lens 50. More specifically, the member 84 is retained to the lens 50 by the placement of the protrusion 96 inside the cavity 104 formed by the clip 100. Thus, the member 84 moves with the lens 50 as the lens 50 is rotated from its first position toward its second position.

Figure 4B:
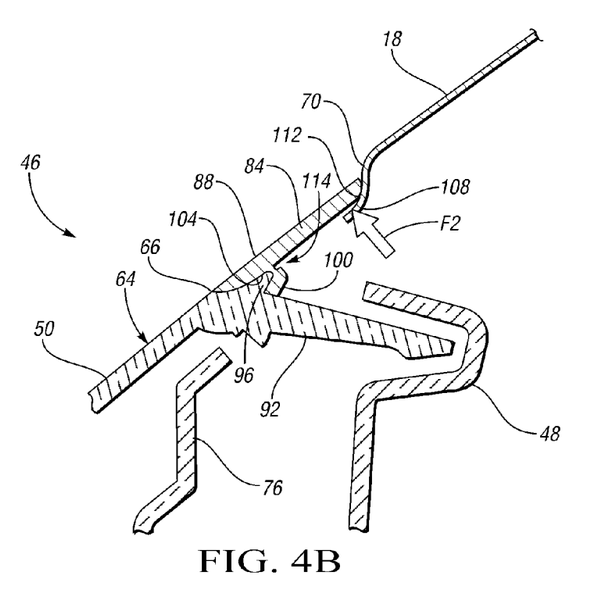
FIG. 4B is a schematic, cross-sectional view of portions of the headlamp assembly and the fender of FIGS. 1-3 with the lens of the headlamp assembly in an intermediate position.
Figure 4C:
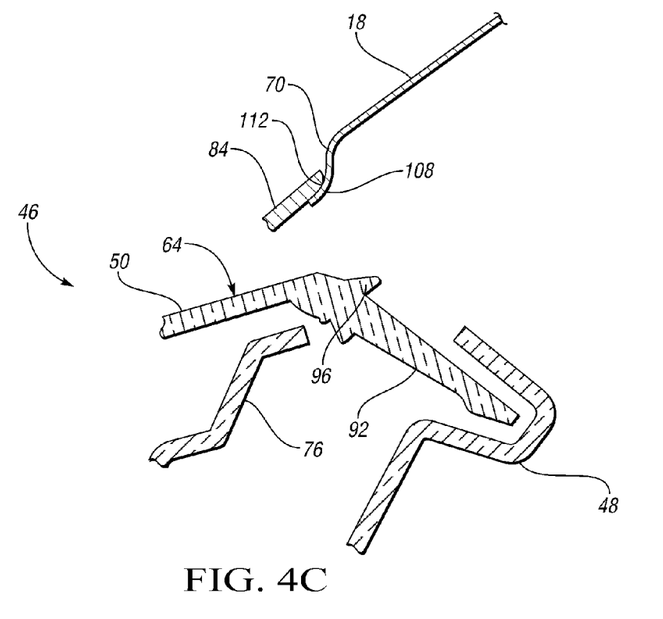
FIG. 4C is a schematic, cross-sectional view of portions of the headlamp assembly and the fender of FIGS. 1-3 with the lens of the headlamp assembly in a second position.

In response to the load (shown at F1 in FIG. 3), the lens 50 rotates from the first position shown in FIG. 4A, through an intermediate position shown in FIG. 4B, to the second position shown in FIG. 4C. Referring to FIG. 4B, when the lens 50 is in the intermediate position, the member 84 contacts portion 108 of the fender 18. More specifically, portion 108 is a flange that extends from edge 70 and that defines surface 112. Surface 112 faces member 84, and exerts a reaction force F2 on the member 84 when the member 84 contacts surface 112. That is, lens 50 transfers part of load F1 to the member 84, thereby driving member 84 against surface 112 and causing a corresponding reaction force F2 on the member 84.

The reaction force F2 is transmitted from the member 84 to the lens 50 via the fastening elements, i.e., the protrusion 96 and the clip 100, and thus opposes continued movement of the lens 50 from the intermediate position to the second position. To permit continued movement of the lens 50 to its second position, even though the member 84 experiences a reaction force F2 opposing such movement, the member 84 includes an engineered strength discontinuity 114 that experiences stress from the reaction force F2. The engineered strength discontinuity 114 is configured such that, when the reaction force F2 exceeds a predetermined amount, the discontinuity 114 experiences sufficient strain, i.e., deformation, to enable the lens 50 to move to the second position shown in FIG. 4C, even though the reaction force F2 prevents continued movement of at least part of the member 84. Within the scope of the claimed invention, "deformation" includes breaking.

In the embodiment of FIGS. 4A-4C, the engineered strength discontinuity 114 is a notch that concentrates stress in the clip 100 so that the clip 100 shears upon sufficient loading from the fender 18. The strain experienced by the member 84 when the lens 50 moves from the intermediate position to the second position absorbs energy from the load shown at F1 in FIG. 3. Accordingly, the member 84 advantageously provides an aesthetic enhancement to the vehicle body 14 by concealing the gap 82 and absorbs energy from the load F1. In an exemplary embodiment, the member 84 is comprised of acrylonitrile butadiene styrene (ABS) plastic. The member 84 may be chrome plated. It should be noted that a rubber closeout member (not shown) or other member may be placed in the gap between the member 84 and the surface 112; in such an embodiment, the reaction force would be transferred from the surface 112 to the member 84 via the rubber closeout or other member.

It should also be noted that an engineered strength discontinuity may be a stress concentration formed by a reduced cross-sectional area, as in the case of a notch, which results in higher strain than surrounding areas, or a strength discontinuity may, for example, be formed from a material having a lower modulus of elasticity or strength than the surrounding material so that the strength discontinuity experiences higher strain than, or breaks before, the surrounding material. A member's strength discontinuity may also be a fastener at which the member is mounted with respect to the lens. It should be further noted that a gap 82 may be filled with, for example, energy absorbing material within the scope of the claimed invention.

FIGS. 5-10 depict alternative headlamp assembly configurations 46A-46F. Headlamp assemblies 46A-46F include respective lenses 50A-50F and respective frame members 84A-84F. Lenses 50A-50F are substantially identical to lens 50 except as noted. Each of members 84A-84F is mounted with respect to a respective lens, extends across at least part of an opening of a gap formed between the respective lens and fender, and is positioned to receive a reaction force from the fender as the respective lens moves from its first position to its second position with respect to the fender 18.

Figure 5:
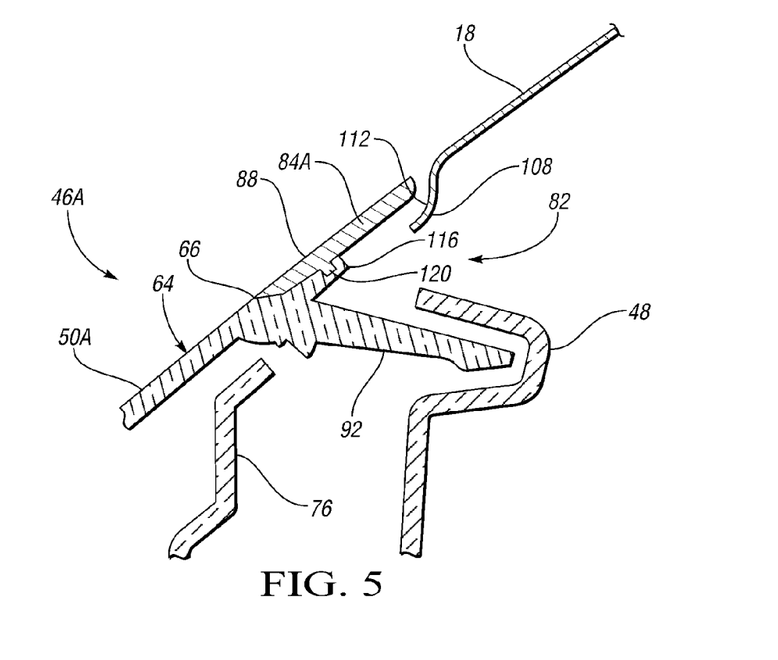
FIG. 5 is a schematic, cross-sectional view of an alternative headlamp assembly in accordance with the claimed invention.

Referring to FIG. 5, wherein like reference numbers refer to like components from FIGS. 1-4C, headlamp assembly 46A includes lens 50A. Lens 50A defines an arm 116, which protrudes from arm 92. Member 84A, which extends across at least a portion of the opening of the gap 82 and defines vehicle body exterior surface 88, is connected to the arm 116 of the lens 50A by a sonic tack 120. The sonic tack 120 is an engineered strength discontinuity that is configured to break when the reaction force from the fender 18 exceeds a predetermined amount.

Figure 6:
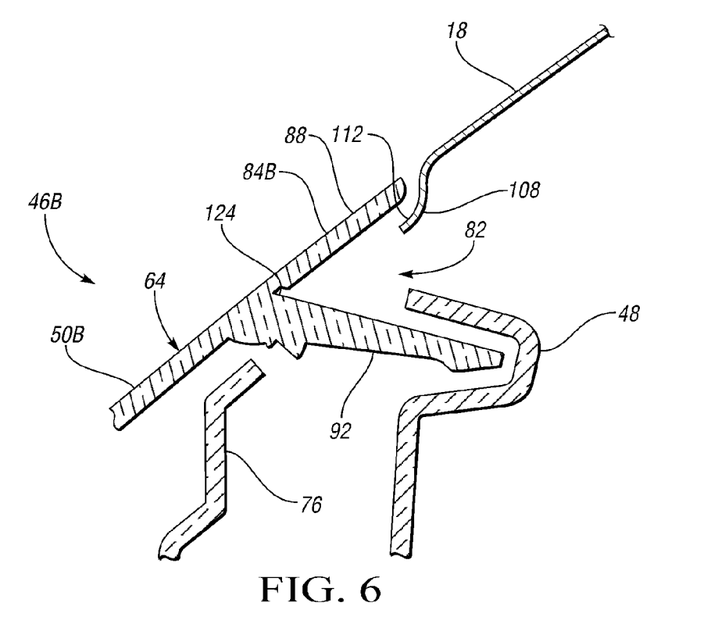
FIG. 6 is a schematic, cross-sectional view of another alternative headlamp assembly in accordance with the claimed invention.

Referring to FIG. 6, wherein like reference numbers refer to like components from FIGS. 1-5, alternative headlamp assembly 46B is schematically depicted. Headlamp assembly 46B is substantially identical to the headlamp assembly shown at 46 in FIGS. 1-4C, except that the member 84B, which extends across at least a portion of the opening of the gap 82 and defines vehicle body exterior surface 88, is an extension of the lens 50B. More specifically, member 84B is an integrally molded part of the lens 50B, and is thus part of the same piece of material as, e.g., the surface shown at 54 in FIG. 1. The member 84B is characterized by an engineered strength discontinuity in the form of a notch 124. Notch 124 concentrates stress from the reaction force of surface 112 so that the lens 50B deforms at the notch 124 when the reaction force from the fender exceeds a predetermined amount. It may be desirable to paint the backside of member 84B.

Figure 7:
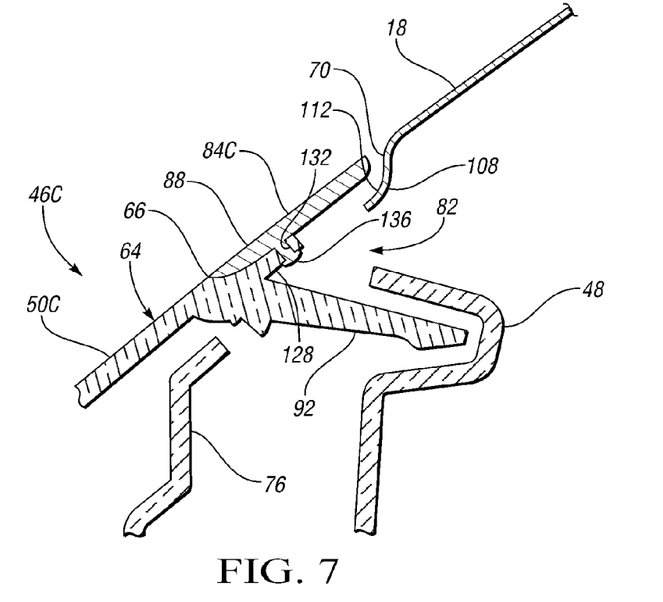
FIG. 7 is a schematic, cross-sectional view of yet another alternative headlamp assembly in accordance with the claimed invention.

Referring to FIG. 7, wherein like reference numbers refer to like components from FIGS. 1-6, lens 50C of headlamp assembly 46C defines arm 128. Arm 128 defines a hole 132. Member 84C includes a stud 136 that extends through the hole 132 and is heat staked to the arm 128. The heat stake is an engineered strength discontinuity that is configured to break when the reaction force from the fender 18 on the member 84C exceeds a predetermined amount.

Figure 8:
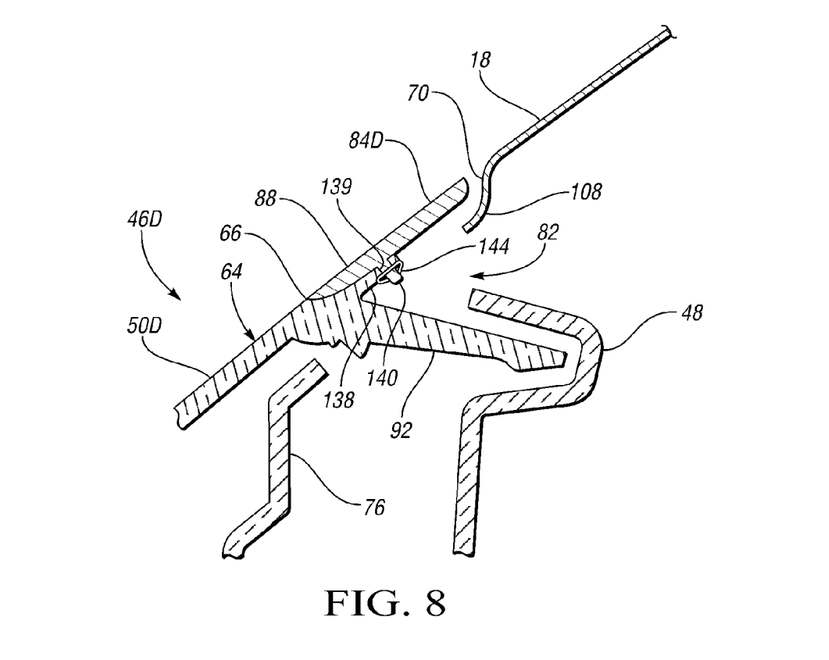
FIG. 8 is a schematic, cross-sectional view of yet another alternative headlamp assembly in accordance with the claimed invention.

Referring to FIG. 8, wherein like reference numbers refer to like components from FIGS. 1-7, headlamp assembly 46D includes lens 50D. Lens 50D defines an arm 138 having a hole 139 formed therein. Member 84D includes a stud 140 that extends through the hole 139. A push-on steel clip 144 connects the stud 140 to the arm 138 of the lens 50D. The steel clip 144 is configured to strip when the member 84 receives a sufficient reaction force from the fender 18, thereby separating the lens 50D from the member 84D.

Figure 9:
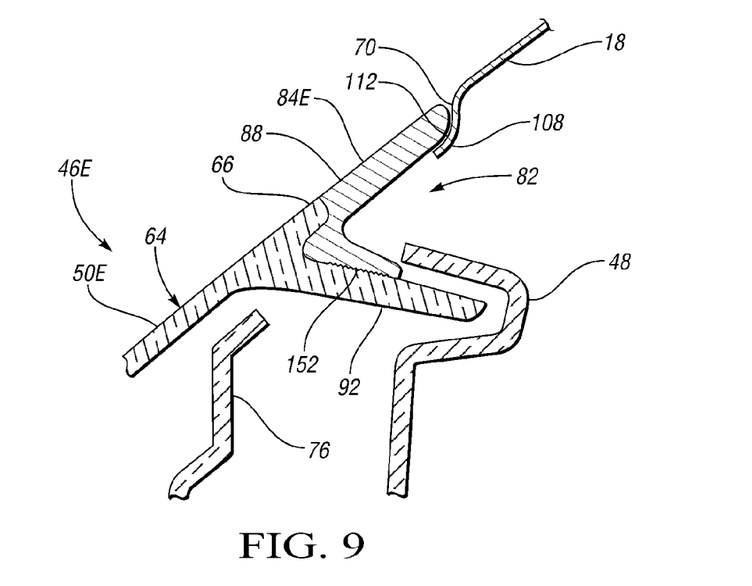
FIG. 9 is a schematic, cross-sectional view of yet another alternative headlamp assembly in accordance with the claimed invention.

Referring to FIG. 9, wherein like reference numbers refer to like components from FIGS. 1-8, member 84E is comprised of firm rubber, and is mounted to arm 92 of the lens 50E by adhesive 152. Alternatively, and within the scope of the claimed invention, member 84E may be mounted to the lens 50 by, for example, mechanical fasteners. The modulus of elasticity and cross section of the member 84E is configured such that the member 84E deforms sufficiently upon receipt of the reaction force to permit the lens 50E to rotate to its second position.

Figure 10:
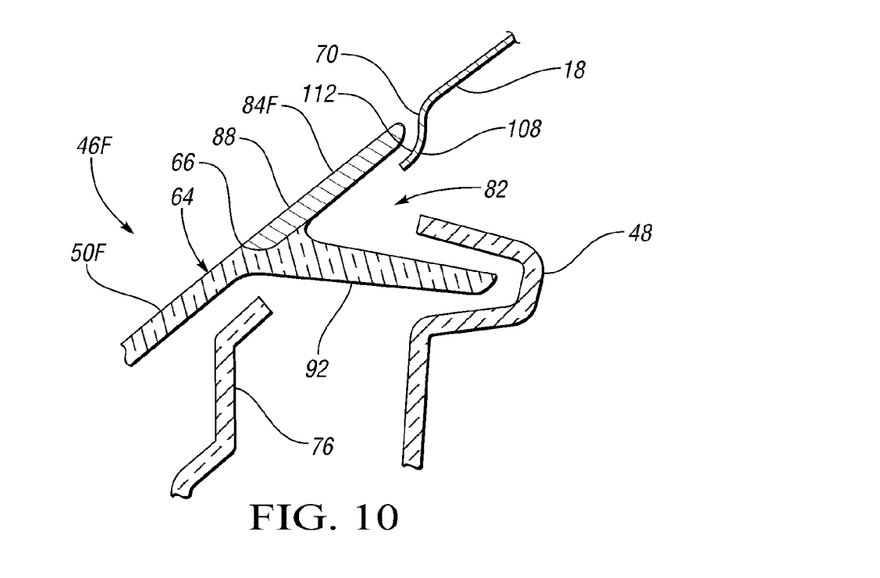
FIG. 10 is a schematic, cross-sectional view of yet another alternative headlamp assembly in accordance with the claimed invention.

Referring to FIG. 10, wherein like reference numbers refer to like components from FIGS. 1-9, headlamp assembly 46F includes member 84F comolded to lens 50F. In an exemplary embodiment, member 84F is comprised of ethylene propylene diene monomer (EPDM) rubber, which is softer than the material of the lens 50F. Accordingly, the strength discontinuities of members 84E and 84F are at the connections of the members 84E, 84F to their respective lenses 50E, 50F. The lenses 50E, 50F have a higher modulus and strength than the members 84E, 84F, and thus deformation will take place in the members 84E, 84F as a result of the reaction force from the fender 18.

It should be noted that the configuration of the flange 108 of the fender 18 is merely exemplary and other fender configurations may be employed within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A vehicle body comprising:
   a fender; and
   a headlamp assembly defining a generally horizontal, upwardly exposed and unobstructed surface, and being movably mounted with respect to the fender such that the headlamp assembly moves from a first position to a second position in response to a load having a downward component acting on the surface;
   wherein the headlamp assembly includes a member sufficiently positioned to receive a reaction force from the fender in response to the load having a downward component; and
   wherein the member is characterized by a strength discontinuity at which the member breaks when the reaction force exceeds a predetermined amount.

2. The vehicle body of claim 1, wherein a portion of the headlamp assembly extends over a portion of the fender.

3. The vehicle body of claim 1, wherein the headlamp assembly is configured to rotate with respect to the fender in response to the load.

4. The vehicle body of claim 1, wherein the headlamp assembly includes a lens, and wherein the lens defines the surface.

5. The vehicle body of claim 1, wherein the member includes a clip portion; wherein the clip portion is connected to the lens; and wherein the clip is configured to shear when the reaction force exceeds a predetermined value.

6. The vehicle of claim 1, wherein the member is a portion of the lens; and wherein the lens includes a locally weakened segment configured to deform when the reaction force exceeds a predetermined value.

7. The vehicle of claim 1, wherein the member is mounted with respect to the lens by a heat stake, and wherein the heat stake is configured to break when the reaction force exceeds a predetermined value.

8. The vehicle of claim 1, wherein the member comprises a material having a lower strength or modulus than the lens.

9. The vehicle of claim 1, wherein the lens and the fender define a gap therebetween; and wherein the member at least partially conceals the gap.

10. The vehicle of claim 1, wherein the member is configured such that the member absorbs energy from the load having a downward component.

11. A headlamp assembly for a vehicle body having a fender, the headlamp assembly comprising:
    a lens defining a surface, the headlamp assembly being mountable to the body such that the surface is upwardly exposed and unobstructed and such that the lens moves with respect to the fender in response to a load having a vertical component being applied to the surface; and
    a member being mounted to the lens such that the member receives a reaction force from the fender when the lens moves in response to the load;
    wherein the member is configured to deform when the reaction force exceeds a predetermined value; and
    wherein the member is a portion of the lens; and wherein the lens includes a locally weakened segment configured to deform when the reaction force exceeds a predetermined value.

12. The headlamp assembly of claim 11, wherein the member comprises a material having a lower strength or modulus than the lens.

13. A headlamp assembly for a vehicle body having a fender, the headlamp assembly comprising:
  a lens defining a surface, the headlamp assembly being mountable to the body such that the surface is upwardly exposed and unobstructed and such that the lens moves with respect to the fender in response to a load having a vertical component being applied to the surface; and
  a member being mounted to the lens such that the member receives a reaction force from the fender when the lens moves in response to the load;
  wherein the member is configured to deform when the reaction force exceeds a predetermined value; and
  wherein the member is mounted with respect to the lens by a heat stake, and wherein the heat stake is configured to break when the reaction force exceeds a predetermined value.

* * * * *